(12) United States Patent
Rahman et al.

(10) Patent No.: US 10,913,683 B2
(45) Date of Patent: Feb. 9, 2021

(54) CEMENT-BASED DIRECT INK FOR 3D PRINTING OF COMPLEX ARCHITECTED STRUCTURES

(71) Applicants: Saudi Arabian Oil Company, Dhahran (SA); William Marsh Rice University, Houston, TX (US)

(72) Inventors: Muhammad M Rahman, Houston, TX (US); Seyed Mohammad Sajadi, Houston, TX (US); Ashok Kumar, Houston, TX (US); Peter J Boul, Houston, TX (US); Carl Thaemlitz, Houston, TX (US); Pulickel M Ajayan, Houston, TX (US)

(73) Assignees: Saudi Arabian Oil Company, Dhahran (SA); William Marsh Rice University, Houston, TX (US)

( * ) Notice: Subject to any disclaimer, the term of this patent is extended or adjusted under 35 U.S.C. 154(b) by 0 days.

(21) Appl. No.: 16/596,396

(22) Filed: Oct. 8, 2019

(65) Prior Publication Data
US 2020/0181014 A1 Jun. 11, 2020

Related U.S. Application Data

(60) Provisional application No. 62/742,706, filed on Oct. 8, 2018.

(51) Int. Cl.
| | | |
|---|---|---|
| *B28B 1/00* | (2006.01) | |
| *C04B 14/10* | (2006.01) | |
| *C04B 16/02* | (2006.01) | |
| *C04B 24/26* | (2006.01) | |
| *B33Y 70/00* | (2020.01) | |
| *B33Y 80/00* | (2015.01) | |
| *C04B 103/32* | (2006.01) | |
| *C04B 111/00* | (2006.01) | |
| *C04B 7/02* | (2006.01) | |

(52) U.S. Cl.
CPC ........... *C04B 7/02* (2013.01); *B28B 1/001* (2013.01); *C04B 14/104* (2013.01); *C04B 16/02* (2013.01); *C04B 24/2641* (2013.01); *B33Y 70/00* (2014.12); *B33Y 80/00* (2014.12); *C04B 2103/32* (2013.01); *C04B 2111/00181* (2013.01)

(58) Field of Classification Search
CPC ........... B28B 1/001; C04B 7/02; C04B 14/10; C04B 14/101; C04B 14/104; C04B 16/02; C04B 24/223; C04B 24/226; C04B 24/2641; C04B 2103/32; C04B 2111/00181; B33Y 70/00; B33Y 80/00
See application file for complete search history.

(56) References Cited

U.S. PATENT DOCUMENTS

| | | |
|---|---|---|
| 9,388,078 B2 | 7/2016 | Rael |
| 9,416,051 B2 | 8/2016 | Kuhlman et al. |
| 9,650,296 B2 | 5/2017 | Rahman et al. |
| 10,266,747 B1 | 4/2019 | Rahman et al. |
| 2011/0177188 A1 | 7/2011 | Bredt et al. |
| 2018/0057405 A1 | 3/2018 | Al-Chaar et al. |

FOREIGN PATENT DOCUMENTS

| | | |
|---|---|---|
| CN | 102924019 A | 2/2013 |
| CN | 107311561 A | 11/2017 |
| CN | 108129102 A | 6/2018 |
| CN | 108249858 A | 7/2018 |
| CN | 108275924 A | 7/2018 |
| CN | 108658549 A | 10/2018 |
| CN | 109336475 A | 2/2019 |
| CN | 109748557 A | 5/2019 |
| EP | 1491516 A2 | 12/2004 |
| EP | 3260258 A1 | 12/2017 |
| WO | 2018083010 | 5/2018 |
| WO | 2019089771 A1 | 5/2019 |

OTHER PUBLICATIONS

International Search Report and Written Opinion for International Application No. PCT/US2019/055039; dated Jan. 23, 2020; pp. 1-12.

Moini, Mohamadreza et al.; "Additive Manufacturing and Performance of Architectured Cement-Based Materials" Advanced Materials (2018) 1802123; pp. 1-11.

Ohen, Mingxu et al.; "Rheological and mechanical properties of admixtures modified 3D printing sulphoaluminate cementitious materials" Construction and Building Materials 189 (2018); pp. 601-611.

Rushing, Todd S. et al.; "Investigation of Concrete Mixtures for Additive Construction" Chapter 7—3D Concrete Printing Technology, 2019; pp. 137-160.

*Primary Examiner* — Anthony J Green (74) *Attorney, Agent, or Firm* — Bracewell LLP; Constance G. Rhebergen; Brian H. Tompkins

(57) ABSTRACT

Provide is a cement ink for a cement ink for 3D printing (which also includes additive manufacturing) of 3D cement structures and materials. The cement ink includes an American Petroleum Institute (API) Class G cement, a nano-clay, a superplasticizer, a hydroxyethyl cellulose, and a defoamer. The nano-clay may be hydrophilic bentonite. The superplasticizer may be a polycarboxylate ether. The defoamer may be 2-ethyl-1-hexanol. Processes for forming the cement ink and printing 3D cement structures using the cement ink are also provided.

22 Claims, 4 Drawing Sheets

CEMENT-BASED DIRECT INK FOR 3D PRINTING OF COMPLEX ARCHITECTED STRUCTURES

CROSS-REFERENCE TO RELATED APPLICATIONS

This application claims priority from U.S. Provisional Application No. 62/742,706 filed Oct. 8, 2018, and titled "CEMENT-BASED DIRECT INK FOR 3D PRINTING OF COMPLEX ARCHITECTED STRUCTURES." For purposes of United States patent practice, this application incorporates the contents of the Provisional Application by reference in its entirety.

BACKGROUND

Field of the Disclosure

Embodiments of the disclosure generally relate to additive manufacturing (such as three-dimensional (3D) printing) and, more particular, to a cement-based direct ink for additive manufacturing of complex architected structures,

Description of the Related Art

Additive manufacturing, which includes or may be referred to as 3D printing, is used to construct a variety of objects and structures. The adoption of 3D printing has resulted technical challenges related to higher resolutions, new source materials, and manufacture of objects and structures of increasing complexity. The expansion of 3D printing into different applications has further increased these challenges. In these and similar applications, the high-resolution 3D printing of complex architecture structures having various geometric shapes and different functions may be difficult using existing technologies. For example, existing materials (such as inks) for 3D printing may be unable to produce these structures, or may be unable to produce structures having the desired geometries and mechanical properties for use in the desired application.

SUMMARY

Patterning synthetic materials through 3D printing offer the possibility of creating and mass-producing materials with organized architectures for enhanced mechanical properties. However, strength and toughness in synthetic materials are often mutually exclusive properties. The precision provided by 3D printing enables the design of synthetic materials with features otherwise unattainable.

Several techniques of additive manufacturing have been developed to 3D print multifunctional and multi-material structures. Such techniques include as selective laser sintering, inkjet printing fused deposited modeling, stereolithography, and 3D plotting. Direct ink writing (DIW) is an extrusion-based technique that provides a relatively large degree of control and flexibility in the design of complex architectures and enable high-resolution material patterning using colloidal materials such as cement.

Thus, for some applications, it may be desirable to form complex architecture structures using cement. However, at ambient conditions, cement undergoes particle jamming and solidification over time, making high-resolution 3D printing with cement impossible or extremely difficult. Various other challenges make the development and use of materials in direct ink printing difficult. The direct ink for 3D printing should be extrudable through the nozzle without high printing pressure. After exiting the nozzle, the self-supporting ink should possess a sufficiently large enough modulus and yield stress point to maintain filamentary shape and thus aid printing processes.

In one embodiment, a printable cement composition is provided. The printable cement composition includes American Petroleum Institute (API) Class G cement, hydrophilic bentonite, a polycarboxylate ether, hydroxyethyl cellulose, and 2-ethyl-1-hexanol.

In another embodiment, a printable cement composition is provided. The printable cement composition includes a cement, a nano-clay, a superplasticizer, hydroxyethyl cellulose, and a defoamer. In some embodiments, the cement is American Petroleum Institute (API) Class G cement. In some embodiments, the nano-clay is hydrophilic bentonite. In some embodiments, the superplasticizer is a polycarboxylate ether. In some embodiments, the defoamer is 2-ethyl-1-hexanol.

In another embodiment, a method for creating a 3D structure is provided. The method includes printing, using a 3D printer, one or more layers of the 3D structure using a printable cement composition. The printable cement composition includes American Petroleum Institute (API) Class G cement, hydrophilic bentonite, a polycarboxylate ether, hydroxyethyl cellulose, and 2-ethyl-1-hexanol. In some embodiments, the 3D structure is a honeycomb structure. In some embodiments, the 3D printer is a direct ink writing (DIW) printer.

In another embodiment, a method for creating a 3D structure is provided. The method includes printing, using a 3D printer, one or more layers of the 3D structure using a printable cement composition. The printable cement composition includes a cement, a nano-clay, a superplasticizer, hydroxyethyl cellulose, and a defoamer. In some embodiments, the cement is American Petroleum Institute (API) Class G cement. In some embodiments, the nano-clay is hydrophilic bentonite. In some embodiments, the superplasticizer is a polycarboxylate ether. In some embodiments, the defoamer is 2-ethyl-1-hexanol. In some embodiments, the 3D structure is a honeycomb structure. In some embodiments, the 3D printer is a direct ink writing (DIW) printer.

DETAILED DESCRIPTION

The present disclosure will now be described more fully hereinafter with reference to the accompanying drawings, which illustrate embodiments of the disclosure. This disclosure may, however, be embodied in many different forms and should not be construed as limited to the illustrated embodiments set forth herein. Rather, these embodiments are provided so that this disclosure will be thorough and complete, and will fully convey the scope of the disclosure to those skilled in the art.

Embodiments of the disclosure include a cement ink for 3D printing (which also includes additive manufacturing) of 3D cement structures and materials. The cement ink may be described or referred to as a "direct" ink, that is an ink used in direct 3D printing such as direct ink writing (DIW). The cement ink may be referred to as a cement ink slurry, such as when used in a 3D printer before formation of a 3D cement structure.

The cement ink described in the disclosure is extrudable and self-supporting, and has rheological properties and cohesive interlayer properties to enable 3D printing of complex architecture structures and overcome the disadvantages of existing cements and inks in such applications. The cement ink has a shear thinning property which facilitates ink extrusion even from a micro-nozzle (for example, a nozzle having a size of about 400 micrometer (($\mu$m)) under ambient conditions. The cement ink also has relatively rapid gel strength development after shearing to be sufficiently strong, stiff and stable to thereby conserve the filamentary shape after extrusion from a nozzle and hold its own weight and the load of the printed layer above without deformation. The cement ink may provide for faster cement setting (as compared to unmodified Portland cement) to enable faster strengthening of the printed materials and aid the printing of more demanding and complex structures.

In some embodiments, the cement ink includes an American Petroleum Institute (API) Class G cement, a nano-clay, a superplasticizer, a hydroxyethyl cellulose, and a defoamer. The components of the cement ink may be mixed in water to form a cement slurry for use.

In some embodiments, the API Class G cement is Dyckerhof Class G Portland cement manufactured by Dyckerhof of Wiesbaden, Germany.

In some embodiments, the nano-clay may be hydrophilic bentonite. As used herein, the term "nano-clay" refers to nanoparticles of layered mineral silicates. The nano-clay may be used as rheology modifier and may modify the shear thinning behavior and yield stress of the resulting cement ink. Additionally, the nano-clay may act on the cement as a cement set accelerator.

In some embodiments, the superplasticizer is a polycarboxylate ether superplasticizer. The polycarboxylate ether superplasticizer may improve the flow characteristics and consistency of the cement ink during printing. polycarboxylate ether superplasticizer may reduce the plastic viscosity of the cement ink, minimize or prevent clumping, and improve consistency and flow of the cement ink over a prolonged time period. Moreover, the amounts of polycarboxylate ether superplasticizer used in the cement ink may decrease the cohesive forces between the cement ink particles and yield stress and result in a better extrusion from a nozzle by applying low pressure while reducing the setting rate of cement. In some embodiments, the polycarboxylate ether superplasticizer is Ethacryl™ G manufactured by Coatex of Genay, France.

The hydroxyethyl cellulose may be used as rheology modifier and may improve the mechanical stability of printed filamentary shapes using the resulting cement ink. In some embodiments, the hydroxyethyl cellulose may be FSA-3 manufactured by Fritz Industries of Mesquite, Tex., USA.

The defoamer may reduce the formation of bubbles, voids, or both during mixing of components to form the resulting cement ink. The defoamer may also reduce or prevent the entrainment of air into printed structures. In some embodiments, the defoamer is 2-ethyl-1-hexanol.

In some embodiments, the cement ink may include silica nanoparticles. In some embodiments, the cement ink may include carbon nanotubes. In some embodiments, the cement ink may include cellulose nanofibrils (also referred to as "nanofibrillar cellulose"). The type and amount of modifier may be enable the variation of mechanical properties of a structure formed using the cement ink.

Advantageously, the cement ink described in the disclosure may exhibit significant shear thinning to enable extrusion through micronozzles under ambient conditions (that is, ambient temperature and pressure) without requiring relatively high printing pressures. Moreover, the cement ink may have a sufficiently high storage modulus and yield strength to maintain the shape of a printed filament even after subjection to the weight of a subsequent printed layer. Additionally, the cement ink described in the disclosure effectively separates the printing process from both the curing process and particle jamming and thus enables the cement ink to print consistently while minimizing or preventing issues of workability and flowability. The ability to print cement structures using the cement ink described in the disclosure may reduce the cost and effort of manufacturing such structures, including complex architecture structures. The ability to print cement structures using the cement ink may also provide for the manufacturing of such structures in hazardous (for example, polluted) or uninhabitable locations.

The cement ink described in the disclosure may be used to print complex and lightweight structures using high-resolution 3D printers (including high-resolution modes of 3D printers). The cement ink may be used to print both cellular and noncellular cement structures. Such structures may include, for example, building components (for example, supports, struts, ties, walls, doorways, beams, piers, foundations, and so on). Embodiments of the disclosure include processes for forming the cement ink. In some embodiments, the cement ink may be formed by mixing American Petroleum Institute (API) Class G cement, the nano-clay, and the hydroxyethyl cellulose may be mixed to form a first mixture. The superplasticizer and defoamer may be added to water to form a second mixture and mixed until a uniform mixture is formed. The first mixture and second mixture may be added to a container to form a third mixture and mixed, such as in a centrifugal mixer. In some embodiments, the third mixture may be mixed at a speed of 2000 revolutions-per-minute (rpm) for about 4 minutes using stainless steel balls (for example, ¼ inch 440 steel balls). Advantageously, the cement ink may be stored at ambient conditions before use for 3D printing.

Embodiments of the disclosure include processes for printing 3D cement structures using the cement ink. In some embodiments, 3D cement structures may be printed using direct ink writing (DIW). In such embodiments, a 3D printer may include or have access to a source (for example, a tray or cartridge) of the cement ink. The 3D printer may be operated to print layers of a 3D cement structure using one or more printing heads each having one or more micronozzles that extrude the cement ink. For example, a 3D printer may be operated to print stacked layers of the cement ink in the same or different patterns. In some embodiments, a 3D cement structure may be printed by printing multiple stacked layers of the cement ink in the same or different patterns.

In some embodiments, a 3D printed cement structure may be cured at ambient temperature for a time period after printing. In some embodiments, the 3D printed cement structure may be cured for at least 4 days.

Embodiments of the disclosure further include processes for additive manufacturing of 3D cement structures or cement materials for various applications using the cement ink. In some embodiments, 3D structures for civil construction, for thermal insulation or for construction products in the energy (for example, oil and gas) industry may be manufactured. For example, in some embodiments cement structures or cement materials for use in oil and gas drilling and production may be manufactured using the cement ink.

Embodiments of the disclosure further include 3D structures and architectures printed using the cement ink and the described processes. The cement ink may enable the printing of 3D structures using architectures that provide improved properties as compared to other inks that are incapable of printing the architectures or structures formed therefrom. The 3D structures printed using the cement ink have improved mechanical properties (for example, strength, impact tolerance, and strain tolerance) as compared to structures using cement or other inks. The 3D structures may maintain the filamentary shape after the cement ink is extruded from a printing nozzle, and each layer in a 3D structure may carry its weight and the load of the printed layer above without deformation.

In some embodiments, a 3D structure printed using the cement ink may be a honeycomb structure. In some embodiments, a 3D structure printed using the cement ink may be a Hilbert curve honeycomb structure, a honeycomb structure with a triangular cell, or a honeycomb structure with a star cell. In some embodiments, a 3D structure printed using the cement ink may be a tubulane.

EXAMPLES

The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

An example cement ink (also referred to as "modified cement") was prepared and tested against an unmodified Portland cement. The example cement ink was prepared by mixing Class G Portland cement with hydrophilic bentonite available from Sigma-Aldrich of St Louis, Mo., USA and a hydroxyethyl cellulose (FSA-3 manufactured by Fritz Industries of Mesquite, Tex., USA). A polycarboxylate ether (Ethacryl™ G manufactured by Coatex of Genay, France) and 2-ethyl-1-hexanol (available from Sigma-Aldrich of St Louis, Mo., USA) were added to water and mix a vortex mixer (available from Fisher Scientific of Hampton, N.H., USA) to form a uniform solution. The components were then poured into a 125 milliliter (ml) container and mixed using a Thinky Planetary Centrifugal Mixer (model AR 230) available from Thinky USA, Inc. of Laguna Hills, Calif., USA, at a speed of about 2000 rpms for about 4 minutes (min) using three ¼ inch 440 stainless steel balls.

Table 1 shows the composition of the example cement ink with amounts listed by weight of cement (BWOC), such that the amount of each component is represented as the weight of the component divided by the weight of cement multiplied by 100%:

TABLE 1

COMPOSITION OF EXAMPLE CEMENT INK

| Cement | Class G well cement | 100% |
|---|---|---|
| Water | | 45%-50% |
| Nano-clay | Hydrophilic bentonite | 4%-8% |
| Superplasticizer | Polycarboxylate ether | 0.75%-1% |
| Thickening agent | Hydroxyethyl cellulose | 0.5% |
| Defoamer | 2-ethyl-1-hexanol | 1% |

Table 2 shows the properties of some of the components of the example cement ink:

TABLE 2

PROPERTIES OF COMPONENTS OF EXAMPLE CEMENT INK

| Cement | Class G well cement | Fineness: 1400-1700 $cm^2$/g<br>8 h Compressive strength:<br>6.4 MPa<br>Phase-$C_3S:C_2S$:<br>C3A:C4AF = 58:19:2:11 |
|---|---|---|
| Nano-clay | Hydrophilic bentonite | Particle size: <25 µm<br>Bulk density: 0.6-1.1 g/$cm^3$ |
| Superplasticizer | Polycarboxylate ether | Viscosity: 340 mPa-s |

Rheological properties of the unmodified Portland cement and example cement ink were measured using Couette geometry mounted on a strain- and stress-controlled rheometer (MCR 302 available from Anton Parr GmbH of Graz, Austria). Flow and viscosity curves were obtained in strain-rate controlled measurement at shear rates from about 1 to about 1000 $s^{-1}$. Oscillatory amplitude sweeps were performed at an angular frequency of about 1 Hz with the strain from about 0.01 to about 10%. To study the thixotropic behavior of the example cement ink, a three-interval thixotropy test (3ITT) was conducted. The first interval was a 15 min small amplitude oscillatory shear (SAOS) experiment with the frequency set to about 1 Hz and the amplitude of the strain set to about 0.1%. The second interval was 5 min of rotational high shear with a shear rate of about 500 $s^{-1}$ while the third interval was a 10 min. SAOS experiment with the frequency set to about 1 Hz and the amplitude of the strain set to about 0.1%.

The effect of nano-clay on the hydration of cement slurries was determined using a TAM Air isothermal calorimeter (available from TA Instruments of New Castle, Del., USA) where data was collected of the heat evolved from the hydration reaction of the cement at 25° C. with time.

A high-resolution 3D printer (Engine HR available from Hyrel 3D of Norcross, Ga., USA) was utilized to print the cement-based ink. A cold flow syringe head (SDS-60 Extruder available from Hyrel 3D of Norcross, Ga., USA) was used to extrude the ink at room temperature. The ink was loaded in a 60 ml Luer-lock syringe and vibrated to make sure that was any bubbles were removed. Smooth-flow tapered tips (available from Nordson EFD of East Providence, R.I., USA) were used to resist clogging and printing discontinuity during the dispensing of the ink. The ink was printed on wax paper to prevent adhesion of cement structures to the build plate and to facilitate detaching the printed object from the build plate. The G-code script was generated using Slic3r (available from http://slic3r.org) and was based on the geometry and other parameters like extrusion width, printing speed, and layer height to determine the print path. The printed parts were cured at room temperature for about 4 days with an intermittent of water via spraying.

Uniaxial in-plane compression tests of cellular structures were conducted at room temperature using an Instron 4505 testing machine (available from Instron of Norwood, Mass., USA) equipped with a 100 kilonewtons (kN) load cell. The samples were held between two crossheads and monitored to avoid misalignment or detachment, then compressed with a constant compression rate of about 1 mm-s$^{-1}$. The load was measured by the load cell while the displacement of the crosshead was recorded. The load-displacement data was recorded, and at least three samples were examined to ensure consistency. To analyze and compare the mechanical performance of example cement ink with the unmodified Portland cement, samples were fabricated by pouring into a 2 in×4 in cylindrical molds and curing in an autoclave at about 21 megaPascals (MPa) and about 80° C. for about 24 hours. After curing, the samples were removed from the autoclave after depressurizing. The cylindrical ends of the samples were polished and then the samples were wrapped with a copper jacket. Strain gauges were epoxied to the surface of the copper jacket, and the copper wrapped samples were seated through pressurization to about 1000 psi in a confining chamber pressurized hydrostatically. The seated and copper jacketed specimens were then placed between two stainless steel endcaps equipped with ultrasonic transducers and placed in the confining vessel of the an Autolab 3000 available from New England Research of Houston, Tex., USA. The specimens were pressurized with a confining pressure of about 4.8 MPa. Axial loading was applied cyclically from about 4.9 MPa to about 24.9 MPa with a periodicity of 30 min. A total of 8 loading cycles were applied to the specimens while mechanical properties were measured both acoustically and mechanically with the ultrasonic transducers and strain gauges respectively.

The unmodified Portland cement was prepared and printed at different speeds and using different nozzle sizes. The unmodified Portland cement experienced two significant problems: discontinuity and clogging were observed in all printing attempts leading to failure in the direct ink 3D writing of the unmodified Portland cement. This failure in the 3D printing appeared to be caused by lack of homogeneity in the unmodified Portland cement slurry, resulting in particle jamming in the syringe and clogging inside the nozzle. Moreover, the unmodified Portland cement slurry had a low plastic viscosity and yield point that caused spreading on the build plate after extrusion through the tip, making it infeasible to print several layers. The presence of air bubbles inside the unmodified Portland cement slurry due to non-uniform mixing also resulted in a discontinuity in printing.

The example cement ink was prepared with various components to achieve the desired rheological properties. Results of the isothermal calorimetry tests revealed that nano-clay acts on cement as a cement set accelerator. As will be appreciated, cement setting is an exothermic process which is readily monitored with calorimetry. There are several different phases or periods in the setting, or hydration, of cement. The induction or dormant period is known as a period of relative inactivity regarding calcium silicate reaction with water. Following this period is a period of rapid heat evolution which is widely regarded to be due to the reaction of tricalcium silicate from the cement with water to produce calcium-silicate-hydrate (C-S-H) and Portlandite. The production of C-S-H is responsible for the early strength of set Portland cement. The different dormant periods of the cement slurries tested with isothermal calorimetry were determined to range from about 5 h (in the case of unmodified Portland cement) and reduce to less than 30 minutes in the case of about 4% nano-clay. The data thus indicated that the nano-clay accelerates the setting of the cement at room temperature. While there is a cement set acceleration effect observed, the influence of nano-clay on the Young's Modulus and Poisson's ratio of set cement was determined to be relatively mild. The samples tested with the NER Autolab 3000 were set at about 80° C. for about 24 hours to remove any effect of cement setting kinetics from the mechanical properties of the set cement. Cement with 1%, 2%, and 4% nano-clay displayed about 10.1%, 10.6%, and 16.5% respective increases in Young's modulus compared with the unmodified cement slurry. There was also a trend in slightly increased Poisson's ratio.

Figure 1A:
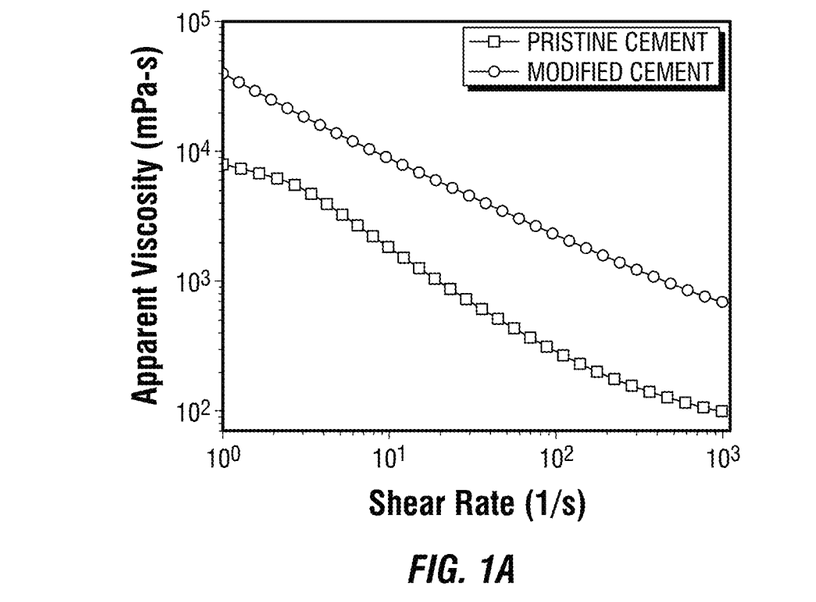
FIGS. 1A-1D are plots illustrating the rheological behavior of an unmodified Portland cement and an example cement ink in accordance with an embodiment of the disclosure.

FIGS. 1A-1D depicts the rheological behavior of the unmodified Portland cement ("unmodified Portland cement" in FIG. 1) and the example cement ink ("modified cement" in FIG. 1). Different non-Newtonian rheological models were used to simulate the flow behavior of the example cement ink. FIG. 1A depicts apparent viscosity vs typical shear rates for the unmodified Portland cement and example cement ink. The slopes of the shear rate vs. apparent viscosity curves linearly decrease with the increase of shear rate; this demonstrates the shear-thinning behavior of the example cement ink. As shown in FIG. 1A, the viscosity of the example cement ink is about two orders of magnitude greater than the unmodified Portland cement.

Figure 1B:
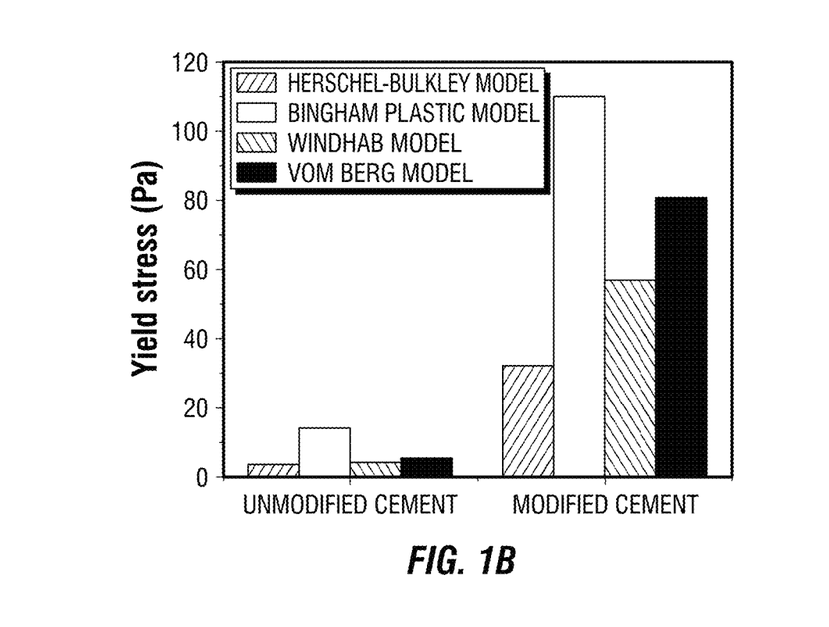

It was determined that Windhab and Herschel-Bulkley models described the cement and example cement ink most accurately. Using the predicted values from the Windhab model, the yield stress of the unmodified Portland cement slurry at the zero-shear-rate ($\tau_0$) was 4.0 Pa while the example cement ink slurry showed a significantly increased yield stress value of around 56.0 Pa. Additionally, the plastic viscosity of the unmodified Portland cement slurry was 0.080 Pa-s but increased to 0.506 Pa-s in the example cement ink slurry. The best fitting results were obtained with the Windhab model with the highest $R^2$ value (~0.999) compared to the Herschel-Bulkley model. FIG. 1B depicts a comparison of the predicted values of yield point and other parameters from the various rheology models. The value of yield point and plastic viscosity predicted by the Windhab model is the larger than that of the Herschel-Bulkley model.

Figure 1C:
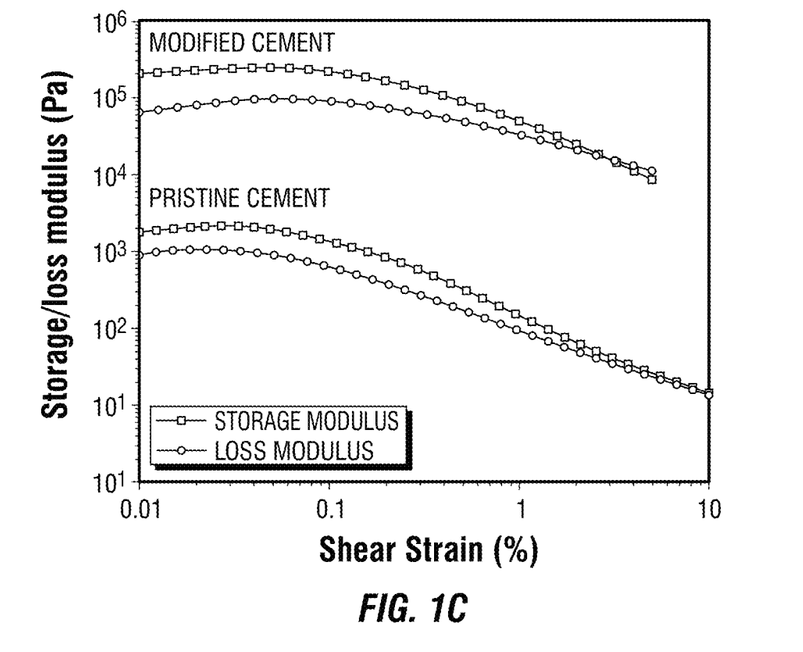

Oscillatory measurements at different strains were carried out to determine the viscoelastic properties of the example cement ink. FIG. 1C depicts the storage modulus and loss modulus as a function of oscillatory strain for the unmodified Portland cement and the example cement ink. A significantly greater storage modulus was observed in the example cement ink as compared to that of the unmodified Portland cement. The unmodified Portland cement exhibited a plateau value of storage modulus (G') of about $2 \times 10^3$ Pa and a loss modulus (G") of about $10^3$ at very low strain (about 0.01%). However, the incorporation of nano-clay and hydroxyethyl-cellulose in the example cement ink increased the storage modulus significantly. The example cement ink had a storage modulus at $2 \times 10^5$ Pa which is 100 times higher than that of the unmodified Portland cement. The storage modulus in the example cement ink was two orders of magnitude higher than the loss modulus (about $9 \times 10^4$ Pa). The ratio of loss modulus to the storage modulus (referred to as tan delta) was thus less than unity for the example cement ink indicating that the cement ink is closer in behavior to a solid than a liquid; as a result, the example cement ink may retain filamentary shape after extrusion from the nozzle. The amplitude sweep illustrated in FIG. 1B shows that the example cement ink has the rheological properties to be flowable and shape-stable for 3D printing of a variety of complex structures. Moreover, the flow point (the cross-over point of G' and G") of the example cement ink occurs at a lower shear strain than the unmodified Portland cement.

Figure 1D:
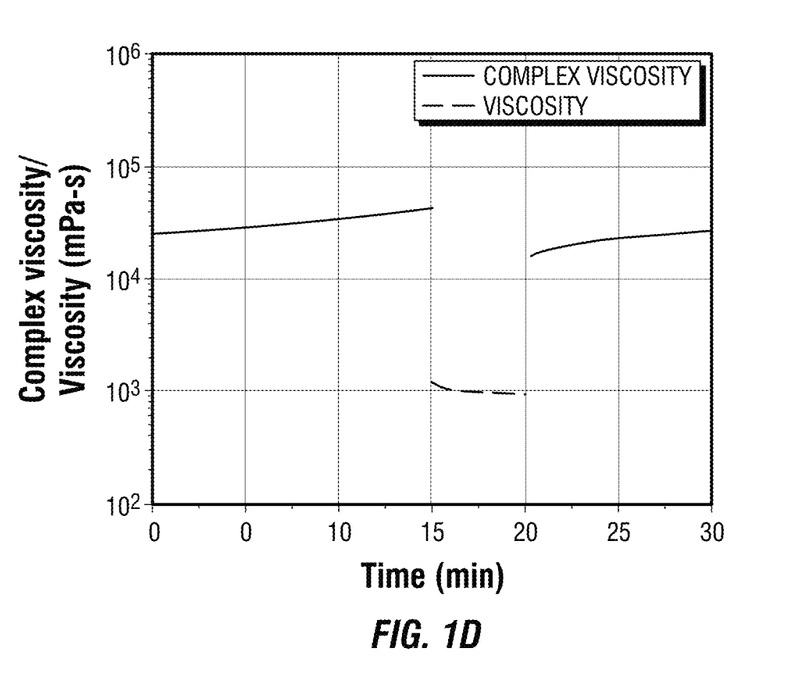

FIG. 1D depicts the thixotropic behavior of the example cement ink determined by a three interval thixotropy test (3ITT). As shown in FIG. 1C, the return of the viscosity and gel structure of the example cement ink after an applied shear rate happens rapidly and almost instantaneously.

Figure 2:
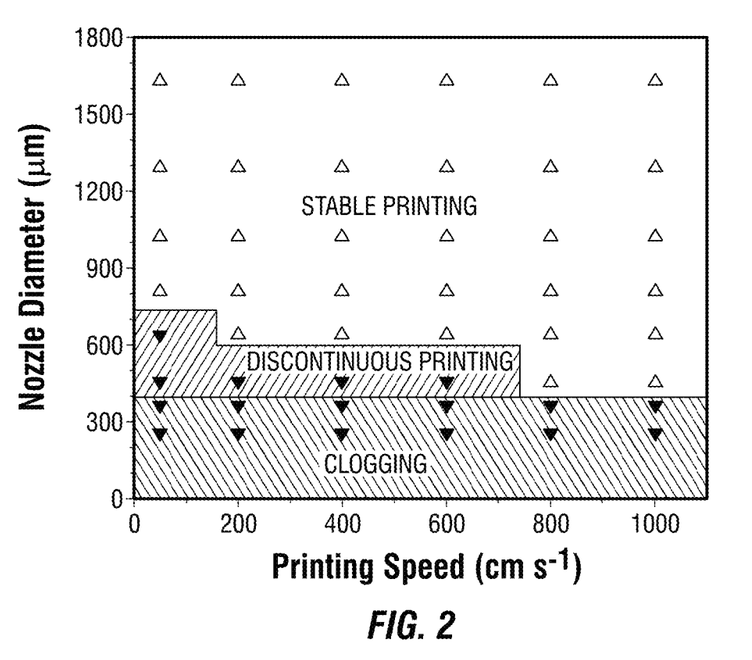
FIG. 2 is a diagram illustrating the printability of an example cement ink as a function of nozzle tip diameter and moving speed of the nozzle in accordance with an embodiment of the disclosure.

FIG. 2 depicts the printability of the example cement ink as a function of nozzle tip diameter and moving speed of the nozzle. The experiments showed that the example cement ink flowed easily through the nozzles when the tip diameter is greater than 700 μm, and that the flow did not depend on the printing speed. Printing was possible even at very low speeds for nozzle sizes over 700 μm. For nozzle sizes between 400-700 μm, it was found that the printing could be stable or unstable depending on the printing speed. The threshold value for nozzle size for the example cement ink was about 400 μm with a limited printing speed interval (about 700 to about 1000 cm/s). As shown in FIG. 2, below a nozzle diameter of 400 μm, the example cement ink exhibited unstable printing at any printing speed due to clogging within the finer nozzles. FIG. 2 shows that by choosing the appropriate size of tip and velocity for 3D printing, a high-resolution structure with high aspect ratio topology may be printed.

Figure 3A:
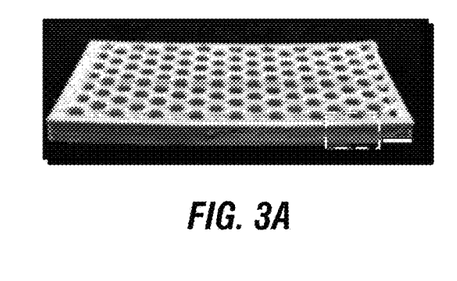
FIGS. 3A-3I are digital images of cellular structures having varying cell geometries printed using an example cement ink in accordance with an embodiment of the disclosure.
Figure 3B:
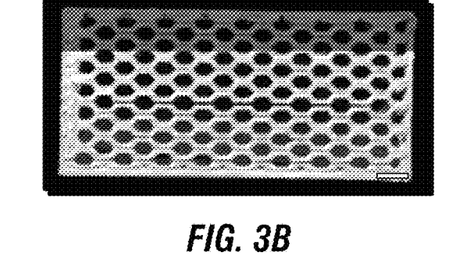
Figure 3C:
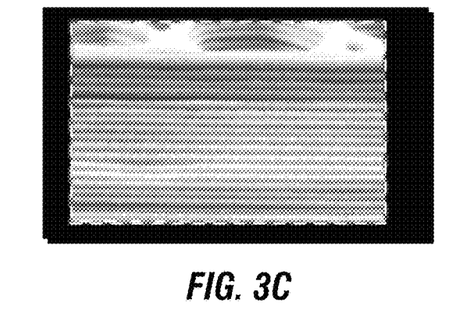

Several cellular structures having varying cell geometry were printed using the example cement ink. FIGS. 3A-3C depict a honeycomb structure printed using the example cement ink from different perspectives. The honeycomb structure of FIGS. 3A-3C were printed with example cement ink using 1.64 mm tapered nozzle. The honeycomb structure had a length of 11 centimeters (cm), a width of 6 cm, and a thickness of 1.6 cm (that is, approximately 40 layers). The resolution of printing in the z-direction is shown in FIG. 3C. Each layer shown in FIG. 3C has a thickness of 400 μm.

Figure 3D:
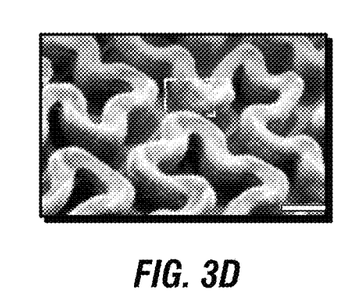
Figure 3E:
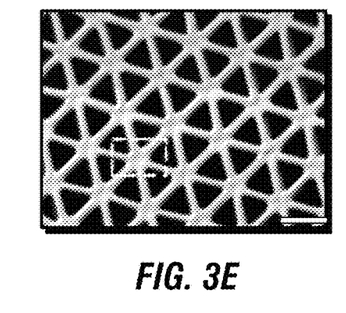
Figure 3F:
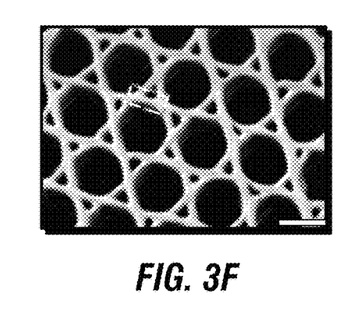

FIGS. 3D-3F depict 3D structures printed in different patterns. Each printed structure was about 8 cm long, 6 cm wide, and 3 cm thick. FIG. 3D depicts a 3D structure printed in a Hilbert curve, with the scale bar representing 1 mm. FIG. 3E depicts a honeycomb structure with a triangular cell, with the scale bar representing 10 mm. FIG. 3F depicts a honeycomb structure with a star cell and having a high aspect ratio including a cell wall thickness of about 600 microns and a height of 8 mm, with the scale bar in FIG. 3F representing 10 mm.

Figure 3G:
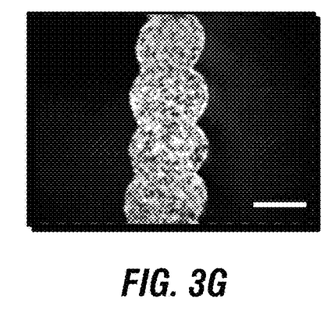
Figure 3H:
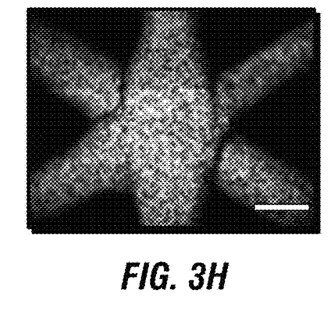
Figure 3I:
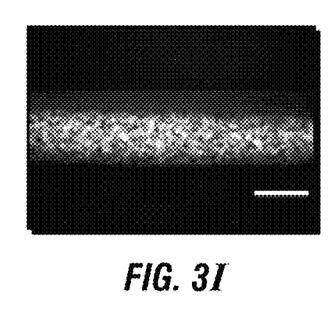

FIGS. 3G-3I depict the respective microscopic view of the structures of FIGS. 3D-3F. Each scale bar in FIGS. 3G-3I represents 500 μm. FIG. 3G depicts a cross-sectional view of some of the printed layers on top of one another for the Hilbert curve 3D structure of FIG. 3D. As shown in FIG. 3G, every layer shows the filamentary shape without any gap between each layer. This structure shows that the example cement ink has enough stiffness to keep its shape after extrusion from the nozzle as well as under the load of the above layers while maintaining superior bonding between layers. FIG. 3H depicts the grid and connection of the honeycomb structure with a triangular cell depicted in FIG. 3E and the deposing of the layers of cement on top of each other. FIG. 3I shows the wall thickness of the honeycomb structure with a star cell depicted in FIG. 3F.

Figure 4:
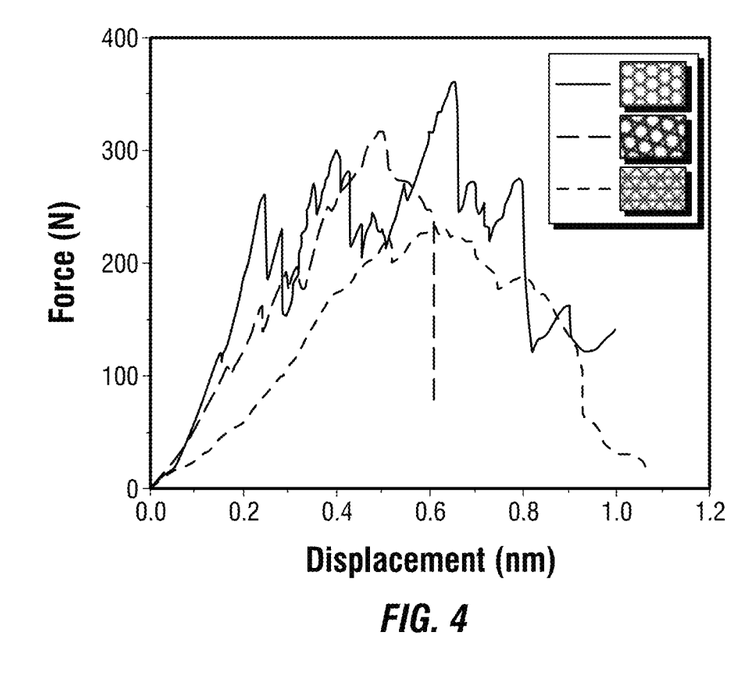
FIG. 4 depicts representative load-displacement plots for the example cement ink cellular architectures in accordance with an embodiment of the disclosure.

To demonstrate the mechanical performance of the example cement ink, in-plane compression tests were performed on different example cement ink cellular architectures with varying cell sizes and geometries. FIG. 4 depicts representative load-displacement plots for the example cement ink cellular architectures. In compression, the structures showed a linear elastic region followed by a small plateau of constant load, and then incremental load drops corresponding to discrete failures. The delocalized damage progression improved the energy dissipation which contributed to the toughness of the materials. Thus, as will be appreciated, the controlling of the architecture can lead to the tuning of toughness without sacrificing the specific strength. The stiffness of cellular structures may be predicted by the relationship shown in Equation 1:

$$\frac{E}{E_s} = B\left(\frac{\rho}{\rho_s}\right)^b \tag{1}$$

where E and ρ are the stiffness, strength, and density of the cellular structures, respectively; $E_s$ and $\rho_s$ is the stiffness, strength, and density of the solid structures, respectively; and B and b are the unit cell-dependent loading constants. For a regular hexagonal honeycomb, B=3/2 and b=3. The measured stiffness of hexagonal honeycomb was found to be around 0.8±0.2 GPa while the stiffness of solid struts (~13.0 GPa) was determined by elastically compressing densely-packed solid cylinders The hexagonal honeycomb structure has a relative density $$\left(\frac{\rho}{\rho_s}\right)$$

of 0.38. Based on the relative density of the honeycomb and measured modulus of solid struts, the calculated stiffness of hexagonal honeycomb was around 1.1 GPa. The structure has the stiffness with a discrepancy of less than 30% from the theoretical values calculated from the measured modulus for solid struts. The discrepancy between the experimental and theoretical predicted values may be attributed to the geometric imperfection, waviness in the layers, and nodal misalignment as can be observed from the microstructures of printed sections As shown above, the rheological measurements of the example cement ink demonstrate its suitability for direct printing of 3D structures having a high aspect ratio geometry. The example cement ink does not show reduced mechanical performance as compared to unmodified Portland cement. The cement ink may thus be used in the manufacturing of complex geometries to obtain new architectures with diverse deflection modes as well as the potential for high load-bearing capacity. Such applications may include, for example, civil construction, thermal insulation and construction products in the energy (for example, oil and gas) industry Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described herein. It is to be understood that the forms shown and described herein are to be taken as examples of embodiments. Elements and materials may be substituted for those illustrated and described herein, parts and processes may be reversed or omitted, and certain features may be utilized independently, all as would be apparent to one skilled in the art after having the benefit of this description. Changes may be made in the elements described herein without departing from the spirit and scope of the disclosure as described in the following claims. Headings used herein are for organizational purposes only and are not meant to be used to limit the scope of the description.

What is claimed is:

1. A printable cement composition, comprising:
American Petroleum Institute (API) Class G cement;
hydrophilic bentonite;
a polycarboxylate ether,
hydroxyethyl cellulose; and
2-ethyl-1-hexanol.

2. The printable cement composition of claim 1, comprising water.

3. A printable cement composition, comprising:
a cement;
a nano-clay;
a superplasticizer;
hydroxyethyl cellulose; and
a defoamer.

4. The printable cement composition of claim 3, wherein the cement comprises American Petroleum Institute (API) Class G cement.

5. The printable cement composition of claim 3, wherein the nano-clay comprises hydrophilic bentonite.

6. The printable cement composition of claim 3, wherein the superplasticizer comprises a polycarboxylate ether.

7. The printable cement composition of claim 3, wherein the defoamer comprises 2-ethyl-1-hexanol.

8. The printable cement composition of claim 3, comprising water.

9. A method for creating a 3D structure, comprising:
printing, using a 3D printer, one or more layers of the 3D structure using a printable cement composition, the printable cement composition comprising:
American Petroleum Institute (API) Class G cement;
hydrophilic bentonite;
a polycarboxylate ether,
hydroxyethyl cellulose; and
2-ethyl-1-hexanol.

10. The method of claim 9, wherein the 3D structure is a honeycomb structure.

11. The method of claim 9, wherein the 3D structure is a tubulane.

12. The method of claim 9, wherein the 3D printer comprise a direct ink writing (DIW) printer.

13. The method of claim 9, wherein the printable cement composition comprises water.

14. A method for creating a 3D structure, comprising:
printing, using a 3D printer, one or more layers of the 3D structure using a printable cement composition, the printable cement composition comprising:
a cement;
a nano-clay;
a superplasticizer;
hydroxyethyl cellulose; and
a defoamer.

15. The method of claim 14, wherein the cement comprises American Petroleum Institute (API) Class G cement.

16. The method of claim 14, wherein the nano-clay comprises hydrophilic bentonite.

17. The method of claim 14, wherein the superplasticizer comprises a polycarboxylate ether.

18. The method of claim 14, wherein the defoamer comprises 2-ethyl-1-hexanol.

19. The method of claim 14, wherein the 3D structure is a honeycomb structure.

20. The method of claim 14, wherein the 3D structure is a tubulane.

21. The method of claim 14, wherein the 3D printer comprise a direct ink writing (DIW) printer.

22. The method of claim 14, wherein the printable cement composition comprises water.

* * * * *